(12) United States Patent
Southworth et al.

(10) Patent No.: US 10,733,960 B2
(45) Date of Patent: Aug. 4, 2020

(54) DISPOSABLE STICKER WITHIN AUGMENTED REALITY ENVIRONMENT

(71) Applicant: SentiAR, Inc., St. Louis, MO (US)

(72) Inventors: Michael K. Southworth, St. Louis, MO (US); Walter Blume, Edwardsville, IL (US); Jennifer N. Avari Silva, St. Louis, MO (US); Jonathan R. Silva, St. Louis, MO (US)

(73) Assignee: SentiAR, Inc., St. Louis, MO (US)

( * ) Notice: Subject to any disclaimer, the term of this patent is extended or adjusted under 35 U.S.C. 154(b) by 0 days.

(21) Appl. No.: 16/422,404

(22) Filed: May 24, 2019

(65) Prior Publication Data
US 2019/0371272 A1    Dec. 5, 2019

Related U.S. Application Data

(60) Provisional application No. 62/677,544, filed on May 29, 2018.

(51) Int. Cl.
| | |
|---|---|
| *G09G 5/12* | (2006.01) |
| *G06T 7/70* | (2017.01) |
| *G06K 7/14* | (2006.01) |
| *H04L 9/08* | (2006.01) |
| *G06K 7/10* | (2006.01) |

(52) U.S. Cl.
CPC ........... *G09G 5/12* (2013.01); *G06K 7/10722* (2013.01); *G06K 7/1417* (2013.01); *G06T 7/70* (2017.01); *H04L 9/0861* (2013.01); *G06T 2207/30204* (2013.01); *G09G 2380/08* (2013.01)

(58) Field of Classification Search
CPC .................................. G09G 5/12; G06T 7/70
See application file for complete search history.

(56) References Cited

U.S. PATENT DOCUMENTS

| | | | |
|---|---|---|---|
| 8,847,850 B1* | 9/2014 | Cho | G02B 27/017 345/7 |
| 9,143,402 B2 | 9/2015 | Tinnakornsrisuphap et al. | |
| 9,405,889 B2 | 8/2016 | da Cruz Pinto et al. | |
| 2005/0234333 A1* | 10/2005 | Takemoto | G02B 27/017 600/426 |
| 2007/0244825 A1* | 10/2007 | Semmer | G06F 21/123 705/59 |
| 2012/0211555 A1 | 8/2012 | Rowe | |
| 2013/0038632 A1 | 2/2013 | Dillavou et al. | |

(Continued)

OTHER PUBLICATIONS

PCT International Search Report and Written Opinion, PCT Application No. PCT/US2019/033974, dated Jul. 24, 2019, 13 pages.

*Primary Examiner* — Jitesh Patel
(74) *Attorney, Agent, or Firm* — Fenwick & West LLP

(57) ABSTRACT

A sticker system includes at least a head-mounted device and a sticker. In an embodiment, the sticker system receives an image of the sticker captured by an imaging sensor. The sticker system determines registration information by processing a fiducial marker of the sticker shown in the image. The sticker system determines location information of the HMD. Additionally, the sticker system determines a position of the sticker relative to the HMD using the registration information and the location information. The sticker system provides a (e.g., augmented reality) graphic to the HMD for presentation to the user based on the position of the sticker.

16 Claims, 4 Drawing Sheets

(56) References Cited

U.S. PATENT DOCUMENTS

| | | |
|---|---|---|
| 2013/0267838 A1 | 10/2013 | Fronk et al. |
| 2014/0002495 A1 | 1/2014 | Lamb et al. |
| 2016/0147492 A1 | 5/2016 | Fugate et al. |
| 2016/0241523 A1* | 8/2016 | Ahn .................... H04L 9/0894 |
| 2017/0354342 A1 | 12/2017 | Ben-Yishai et al. |
| 2018/0011317 A1* | 1/2018 | Hasegawa ............. G06F 3/0481 |

* cited by examiner

DISPOSABLE STICKER WITHIN AUGMENTED REALITY ENVIRONMENT

CROSS REFERENCE TO RELATED APPLICATION

This application claims the benefit of priority to U.S. Provisional Application No. 62/677,544, filed on May 29, 2018, which is incorporated herein by reference in its entirety for all purposes.

TECHNICAL FIELD

This disclosure generally relates to disposable stickers or patches, which may be used for registration of devices within augmented reality (AR) environments.

BACKGROUND

Interventional medical procedures can have complex work environments with multiple medical devices being introduced at various stages, each with their own particular setup mechanisms. Augmented reality (AR) devices are being developed for use in the interventional suite. It is desirable to provide user-friendly mechanisms for tracking use and reliable system setup. Devices operating within such an environment may have strict requirements on cybersecurity and patient confidentiality, which may require engineering trade-offs and sacrificing ease of use in conventional systems for registering the devices.

BRIEF DESCRIPTION OF THE FIGURES

The disclosed embodiments have advantages and features which will be more readily apparent from the detailed description, the appended claims, and the accompanying figures (or drawings). A brief introduction of the figures is below.

SUMMARY

Figure 1:
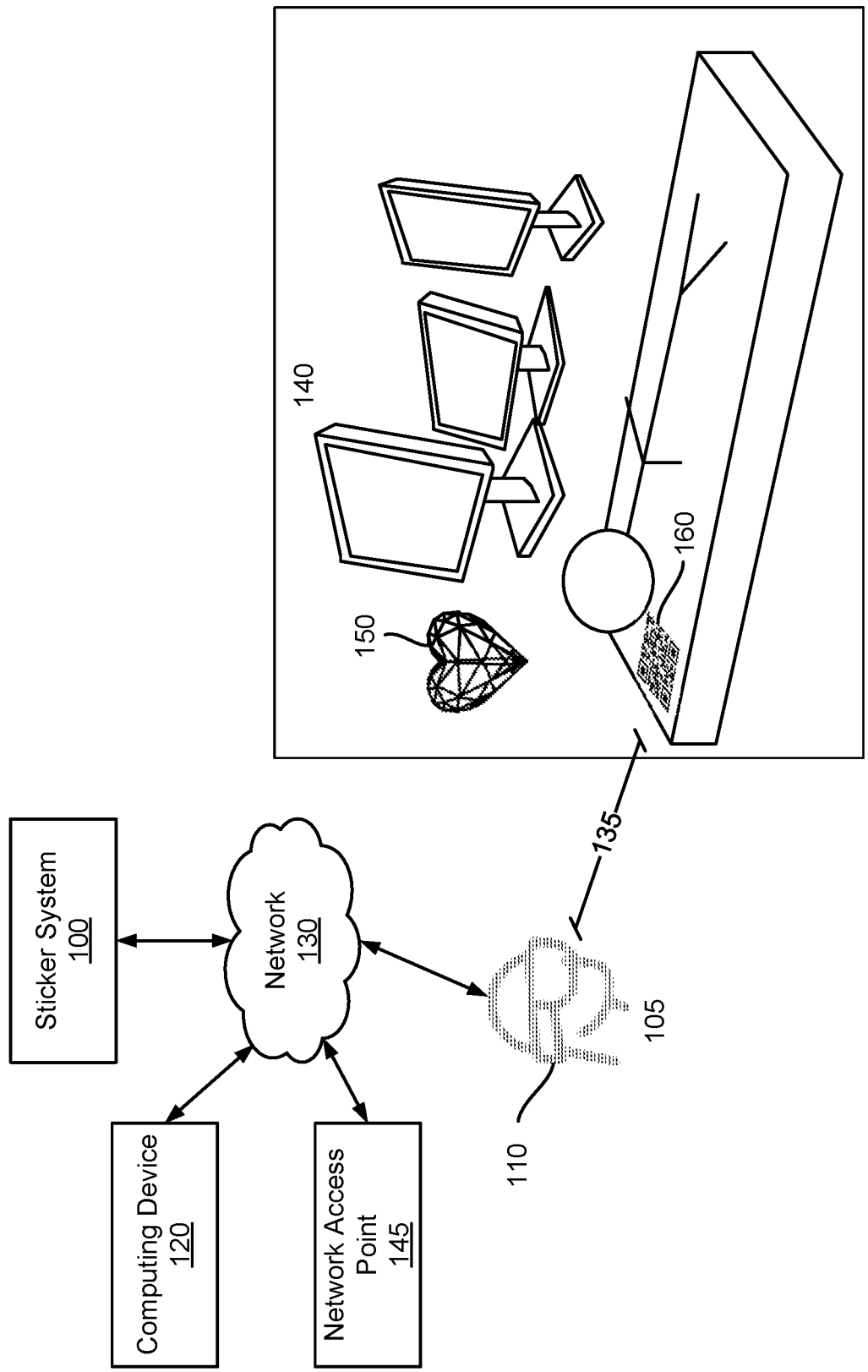
FIG. 1 is an illustration of a system environment, according to various embodiments of the present invention.

Disclosed herein are systems and methods for using stickers, for example, in interventional medical procedure applications. Moreover, the stickers may be used for system security, device registration, or presenting graphics or other data in an augmented reality (AR) environment. To provide useful graphics in an AR environment, spatial locations should be marked and tracked in a non-ambiguous manner. Reference graphics should be placed precisely and dynamically with respect to objects they are referencing.

In one aspect, the sticker system receives an image of a sticker captured by an imaging sensor, where the image shows a fiducial marker of the sticker. The sticker system determines registration information by processing the fiducial marker of the sticker in the image. The sticker system determines location information of a head-mounted device (HMD) worn by a user. The sticker system determines a position of the sticker relative to the HMD using the registration information and the location information. The sticker system provides a graphic to the HMD for presentation to the user based on the position of the sticker.

In some embodiments, the HMD (or sticker system) generates an encryption key using the registration information, where the encryption key is unique to the sticker. The HMD communicates with another device using the encryption key.

In some embodiments, the HMD (or sticker system) generates an encryption key using the registration information for a medical procedure, where the encryption key is unique to the sticker. Responsive to determining that the encryption key was previously used by another device for a different medical procedure, the sticker system determines to not use the encryption key for the medical procedure.

In some embodiments, the sticker system determines additional registration information by processing an additional image showing the fiducial marker of the sticker, where the additional image is captured by an additional HMD. The sticker system determines that the HMD and the additional HMD are being used for a same medical procedure by comparing the registration information and the additional registration information.

In some embodiments, the sticker system determines position of the sticker relative to the HMD by determining a distance and angle in 3D between the sticker and the HMD. In some embodiments, size or orientation of the graphic is determined using the distance and angle.

In some embodiments, the sticker system generates augmented reality content as the graphic, and the HMD includes a display configured to present the augmented reality content. In some embodiments, the imaging sensor is coupled to the HMD. In some embodiments, the fiducial marker is a QR code or a barcode.

In some embodiments, a non-transitory computer-readable storage medium stores instructions that when executed by one or more processors cause the one or more processors to perform steps including any of the methods described herein.

DETAILED DESCRIPTION

I. Example System Overview

FIG. 1 is an illustration of a system environment, according to various embodiments of the present invention. The system environment shown in FIG. 1 includes the sticker system 100, a head-mounted device (HMD) 110 of a user 105, and a computing device 120, which can be communicatively connected to each other via a network 130, e.g., using one or more network access points 145. The network 130 may include wireless and/or wired connections. In other embodiments, the system environment may include any number of users and HMDs. The functions performed by the various entities of FIG. 1 may vary in different embodiments.

I. A. Devices

The HMD 110 may use an imaging sensor to capture an image of a scene 140 that includes a sticker 160. Additionally, an HMD 110 may include one or more of: a sensor to capture information for determining position or orientation of the HMD 110 in physical space (e.g., in two or three dimensions), a microphone to capture audio input of users, a speaker for producing audio output, an imaging sensor for capture of images including digital information encoded in the sticker 160, a wireless means to communicate information (e.g., audio or other sensor data such as position or orientation information) between HMDs 110 or other types of devices, a means for storing information, and one or more processors for computing or controlling the audio communicated between the HMDs 110. In some embodiments, one or more HMDs 110 may be a MICROSOFT HOLOLENS, though various other types of HMDs 110 can also be used including HMDs 110 custom-designed for a medical environment. Example sensors include accelerometers, gyroscopes, inertial measurement units (IMU) (e.g., for determining location information of the HMD 110), depth cameras, and global positioning system (GPS) sensors, ultrasonic sensors, infrared sensors, and proximity sensors, among others.

In some embodiments, a HMD 110 includes an electronic display that displays images to the user 105 in accordance with data received from the sticker system 100, another HMD 110, or another source. Examples of electronic displays include: a liquid crystal display (LCD), an organic light emitting diode (OLED) display, an active-matrix organic light-emitting diode display (AMOLED), a liquid crystal on silicon display (LCOS), some other display, or some combination thereof. In some embodiments, the electronic display may include one or more optical lens, optical waveguides, or optical combiners. In some embodiments, a HMD 110 does not necessarily include an electronic display.

The computing device 120 may include any number of a display, keyboard, touchscreen, optical cameras, network communication device, or processor. The computing device 120 may use an imaging sensor to capture an image including digital information encoded in the sticker 160. The computing device 120 may also use other means to capture the digital information encoded in the sticker 160 (e.g., touchscreen, keyboard, RFID, etc.). The computing device 120 may set a wireless encryption key on the network access point 145 using the captured digital information encoded in the sticker 160. The computing device 120 may receive imaging information captured from an imaging sensor on the HMD 110. The computing device 120 can process or analyze the received imaging information, for example, to provide graphics to one or more HMDs 110.

I. B. Sticker

A sticker 160 includes information that can be detected and used by the sticker system 100 for one or more applications. The sticker 160 may be a one-time use, disposable, and/or printed type of sticker. The sticker 160 may include an adhesive for securing the sticker 160 to a surface. In other embodiments, stickers may not necessarily have an adhesive, but rather resemble a patch, and may be secured to surfaces using other means such as magnets, Velcro, weights, pins, clips, or buttons, among other types of attachment mechanisms. The sticker 160 includes one or more means to establish orientation of the sticker 160 relative to an imaging sensor, and a means for optically encoding (e.g., digital) information, for example, a fiducial marker such as a QR code or barcode.

I. C. Sticker System

The sticker system 100 may identify one or more stickers 160 present in an environment. The sticker system 100 may receive information associated with a sticker 160 from a HMD 110 or computing device 120, which can detect stickers 160 using a sensor. The information may include digital information encoded in the sticker 160 and/or other information about a captured scene 140, e.g., presence, size, and position of other objects in vicinity of the sticker 160. As an example, the sticker system 100 can use the received information to calculate a positional offset 135 from the position of the HMD 110 to position of the sticker 160. The sticker system 100 may use the offset 135 to generate, modify, or display digital content 150 relative to position of the HMD 110 and/or sticker 160.

The sticker system 100 may operate in an AR system, virtual reality (VR) system, mixed reality system, or other types of system environments not necessarily including AR or VR devices. In an AR environment, the (e.g., dynamic) detected position of the sticker 160 may be used as a reference against which AR graphics are positioned for presentation to the user 105 of the HMD 110. The sticker system 100 may run on a HMD 110 or a different computing device 120 such as a server, which may be outside of a room in which a medical procedure is performed.

In some embodiments, the sticker system 100 uses existing mapping data available, collected, or established during system installation or calibration. The sticker system 100 may use information from a HMD 110 to establish a correction between different mapping data sets. For example, responsive to determining that the position of a sticker 160 as determined using mapping data from a HMD 110 deviates (e.g., by at least a threshold discrepancy in position or orientation) than the observed position (or orientation) as sensed by an imaging sensor (e.g., of another computing device 120), the sticker system 100 may apply an offset to one or more data sets to correct the disparity, e.g., modify X, Y, or Z coordinates in a Cartesian coordinate system.

In some embodiments, responsive to the sensed position and/or orientation of the sticker 160, the sticker system 100 (or HMD 110) may establish an independent coordinate system to use for displaying AR information. In an aspect, responsive to sensing data from a sticker 160, the sticker system 100 may combine other sources of data (e.g., private data) with the sensed data to generate a one-time use procedure dataset, e.g., for a surgical or another type of medical or interventional procedure. In another aspect, the HMD 110 or other computing device 120 may use human input to acquire digital information combined with private data for generating a one-time use procedure dataset. In some embodiments, the sticker system 100 uses human input for positioning of reference graphics relative to a detected position of the sticker 160 to determine a reference offset that is applied to the graphics to compensate for subsequent movement of the sticker 160.

I. D. System Security

In some embodiments, the sticker system 100 (e.g., by a HMD 110) may use information associated with a sticker 160 to generate an encryption key to communicate with the network access point 145. In some embodiments, the sticker system 100 uses elliptic curve cryptography (ECC), which is an example class of public key cryptography with a symmetric key exchange. The sticker system 100 uses ECC to generate encryption keys, which may be used by the network access point 145 or other security devices or systems to verify the authenticity of HMDs 110 or computing devices 120. In some embodiments, the sticker 160 can provide an extra token used by the sticker system 100 to verify the authenticity, e.g., after the ECC verification. In various embodiments, a sticker 160 provides enhanced security because the sticker 160 needs to be physically present nearby a HMD 110 such that the HMD 110 can capture an image of the sticker 160, e.g., a QR code of the sticker 160 in particular.

In various embodiments, the sticker system 100 implements a one-time use procedure dataset to prevent re-use of stickers 160. Once a one-time use sticker 160 is used, the sticker 160 may be disposed. The sticker system 100 may determine unauthorized use of stickers 160 by tracking previously used one-time use stickers 160. The sticker system 100 may use the procedure dataset to establish a one-time use encryption key for wired or wireless network communication. The sticker system 100 can also detect and use encoded information of a sticker 160 as a component of a symmetric key being exchanged as a transport layer encryption. In some embodiments, the sticker system 100 uses information associated with stickers as an encryption key for the hardware layer in wireless key exchange, or as a seed for the negotiation of the wireless encryption key. In an embodiment, the sticker system 100 may use information associated with stickers 160 as a component for an application layer encryption scheme. In an embodiment, the sticker system 100 uses information associated with stickers 160 as an encryption key or as a seed for an encryption key for transmitting application data over the network 130.

I. E. Multi-User Examples

In various embodiments, the sticker system 100 may use information associated with stickers 160 in use cases including multiple HMDs 110 and/or users 105, e.g., physicians and/or other personnel performing a medical procedure. For example, a HMD 110 may communicate the calculated offset 135 over the network 130 in a shared coordinate system between multiple HMDs 110 to establish a correction for one or more (or all) of the other HMDs 110. In this aspect, one or more HMDs 110 may display or modify digital content 150 responsive to the sticker system 100 determining that at least one HMD 110 detected a sticker 160 and captured the associated encoded information. In another aspect, a particular HMD 110 may use position or orientation sensors to display digital content 150 responsive to determining that at least a portion of the sticker 160 is outside of the field view of an imaging sensor of the HMD 110.

In some embodiments, the sticker system 100 may use information from one or more of HMDs 110 to map the location of a given one of the HMDs 110 relative to a particular sticker 160. In some embodiments, each of multiple HMDs 110 may independently calculate the offset 135 to position of the sticker 160 for displaying digital content 150. The sticker system 100 may customize graphics for a certain HMD 110 based on the corresponding offset 135.

II. Example Data Flow

Figure 2:
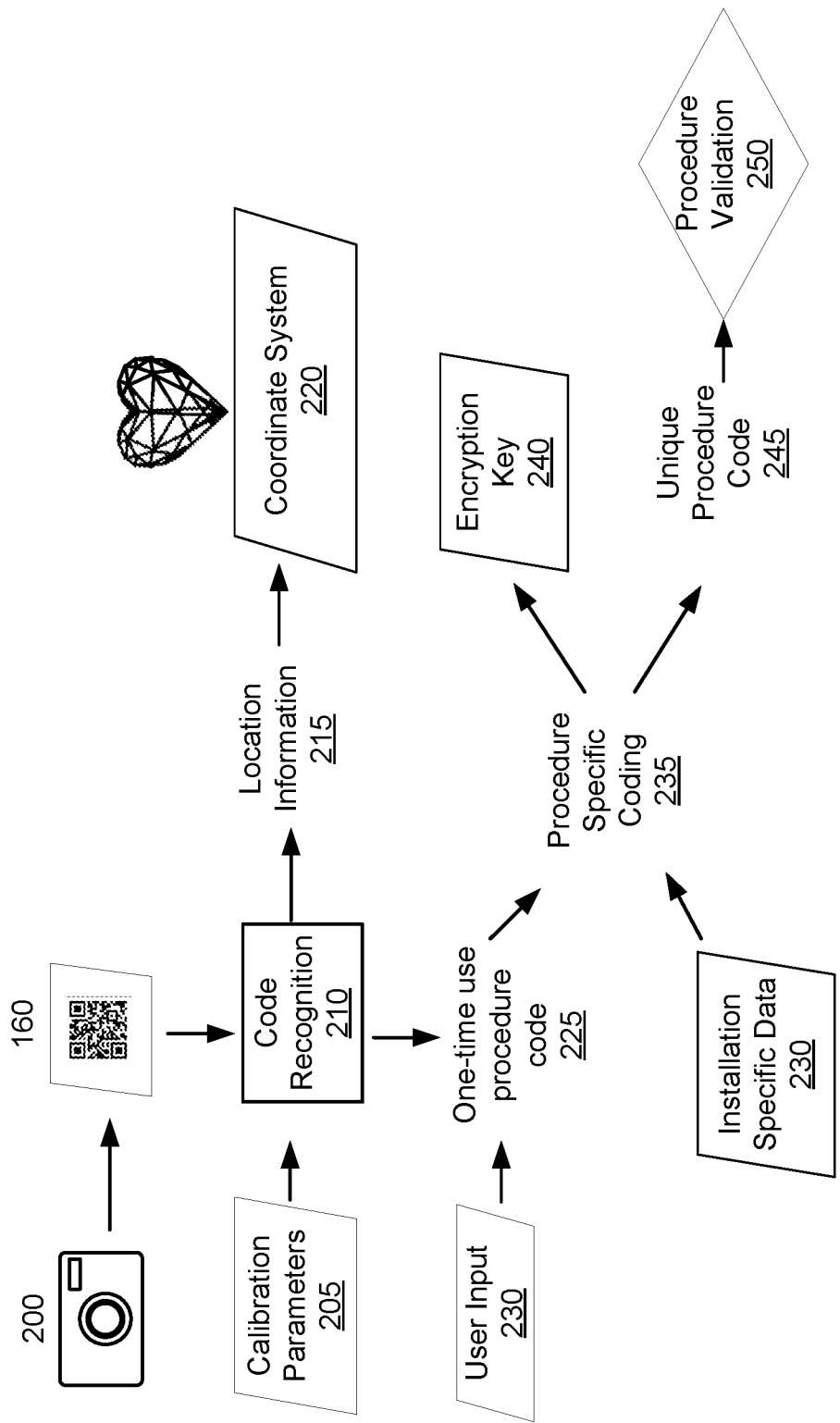
FIG. 2 is a data flow diagram of the sticker system, according to various embodiments of the present invention.

FIG. 2 is a data flow diagram of the sticker system 100, according to various embodiments of the present invention. The sticker system 100 may use digital information captured from the sticker 160 or input by a user to generate one or more of position and/or orientation data, encryption keys, and one-time use procedure codes. In various embodiments, an imaging sensor 200 (e.g., of HMD 110 or computing device 120) captures an image including information encoded by the sticker 160. The sticker system 100 can use calibration parameters 205 for the imaging sensor 200 and a coordinate system for a code recognition algorithm 210 to extract location information 215, e.g., one or more of scale, distance, and angle information in up to three dimensions. The distance and angle may indicate a relative position between the imaging sensor 200 and the sticker 160. The scale may indicate a size of the sticker 160 relative to an image captured by the imaging sensor 200 or another reference. The sticker system 100 may use the location information 215 to determine an origin for a (e.g., 3D) coordinate system 220, for example, for displaying 3D AR content on HMDs 110 or other displays.

The sticker system 100 can use the code recognition algorithm 210 to generate a one-time use procedure code 225. Alternatively, the one-time use procedure code 25 may be provided to the sticker system 100 by user input 230. The sticker system 100 may use the one-time use procedure code 225 with installation specific data 230 in procedure specific coding 235 to generate one or more unique encryption keys 240 and unique procedure code 245. The sticker system 100 may use the unique procedure code 22 in procedure validation 250 to verify authenticity and single use of the one-time use procedure code 225.

In an embodiment, each networked device independently completes process shown in FIG. 2, e.g., such that all devices in the sticker system 100 have their respective key to establish network communications. However, for security purposes, neither the key itself, nor any information used to generate the key, is transmitted wirelessly between devices.

III. Example Stickers

Figure 3:
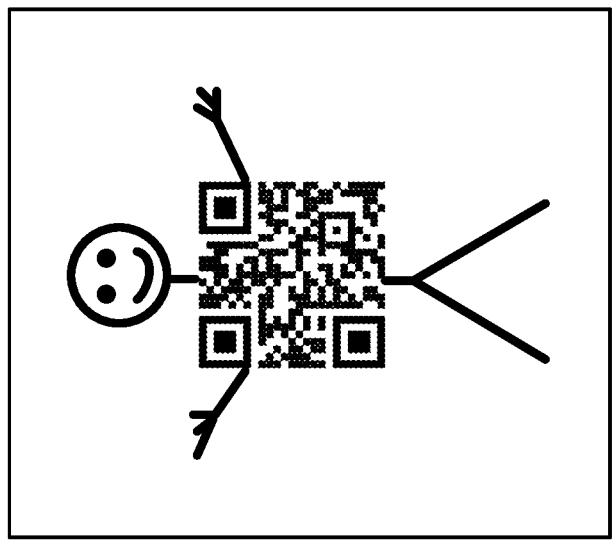
FIG. 3 is an illustration of example stickers, according to various embodiments of the present invention.
Figure 3:
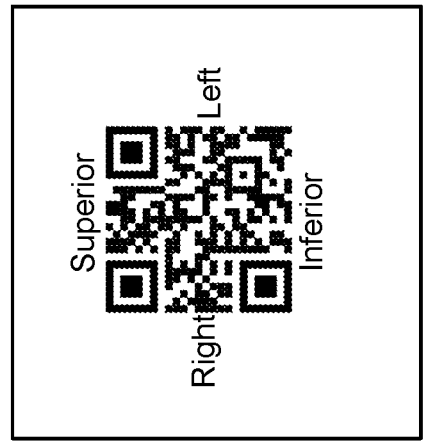

FIG. 3 is an illustration of example stickers, according to various embodiments of the present invention. Sticker 300 includes a QR code with anatomical words adjacent to the QR code to serve as a hint or indication to a user to position the sticker 300 in relation to a patient on a (e.g., surgical operating) table or another object. Sticker 310 includes a QR code with a humanoid or cartoon icon (representing a patient) showing the correct orientation for sticker placement.

In some embodiments, a sticker includes a fiducial marker or an optical pattern that is unique in rotation and of known scale. The fiducial marker may encode bits of data, which may be used for location calculation or security applications. A QR code is scale invariant and may be produced (e.g., printed) to known size. Based on known sizes of QR codes or other attributes of QR codes, the sticker system 100 may encode one or more of scale, rotation, and additional data in the same instance of a QR code or another type of unique fiducial marker. A sticker may also independently encode scale and rotation from additional data bits in a separate marker, for example, a barcode or a sequence of alphanumeric and/or hexadecimal characters. The sequence of characters may be adjacent to a rotationally unique optical marker of known scale.

IV. Example Method

Figure 4:
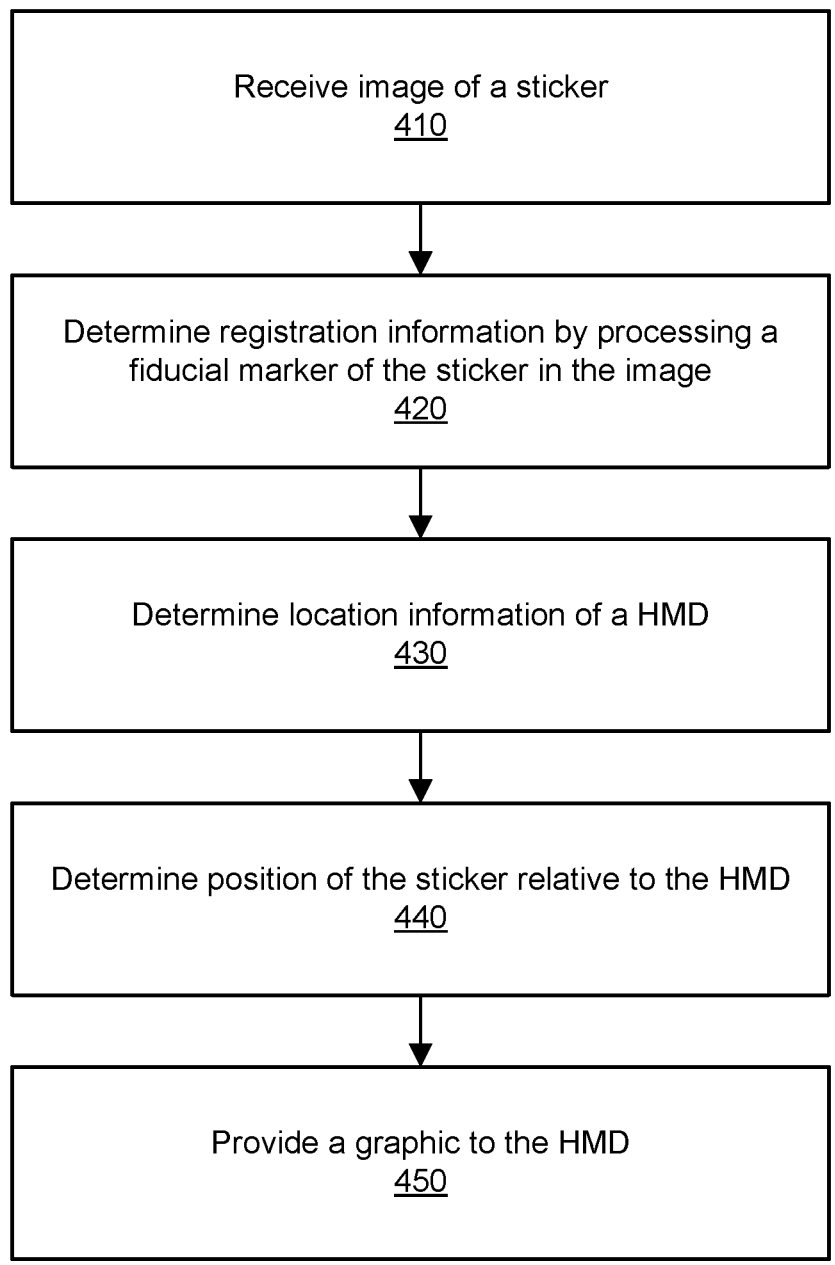
FIG. 4 is a flowchart of a process of device registration using stickers, according to various embodiments of the present invention.

FIG. 4 is a flowchart of a process 400 of device registration using stickers, according to various embodiments of the present invention. In various embodiments, the sticker system 100 may register a device such as an HMD 110 (or computing device 120) to authorize the HMD 110 for receiving or providing information associated with a medical or interventional procedure. Additionally or alternatively, registration can be used to determine (or recalibrate) position of a registered device relative to boundaries of a room or another reference. The sticker system 100 may perform the method 400 in the system environment shown in FIG. 1.

The sticker system 100 receives 410 an image of a sticker 160 captured by an imaging sensor (e.g., of a HMD 110 or computing device 120), where the image shows a fiducial marker of the sticker 160, e.g., resembling the example QR codes shown in FIG. 3. The sticker system 100 determines 420 registration information by processing the fiducial marker of the sticker 160 in the image. Methods for detection of sticker fiducial markers are well known in the literature. In an embodiment, the sticker fiducial markers include high contrast black and white graphics such as a QR code. The registration information may include any number of attributes of the fiducial marker such as a size or orientation of a QR code. The registration information may include other types of information related to a medical procedure, e.g., a room in which the procedure will be conducted, locations or dimensions of objects in the room (which may be used as references for positioning), patient, user, or device information (e.g., HMDs) involved in the medical procedure.

The sticker system 100 determines 430 location information of a HMD 110 worn by a user 105. The imaging sensor may be coupled to the HMD 110. The sticker system 100 determines 440 a position of the sticker 160 relative to the HMD 110 using the registration information and the location information. The sticker system 100 provides 450 a graphic and appropriate 3D positioning information relative to the HMD 110 for presentation to the user 105 based on the position of the sticker 160. Referring to the example illustrated in FIG. 1, the graphic may include AR content such as a 3D rendering of physiology of a patient. For instance, a graphic of a heart (or a model of another physiological body part) is displayed by the HMD 110 for a cardiology procedure. The graphic may indicate position of a medical instrument relative to a body part. For example, the graphic may show a catheter being navigated into a patient's body by a physician.

In various embodiments, the sticker 160 may be attached to an operating table or another (e.g., stationary) object in vicinity of the patient during the procedure. In other embodiments, the sticker 160 is affixed to a non-stationary object (e.g., a mobile table, chair, or equipment), and the sticker system 100 can update the registration information as new images of the sticker 160 are received. Thus, in an AR environment, the sticker system 100 may provide graphics that are perceived by the user 105 as attached to a moving object.

In some embodiments, the sticker system 100 determines a size or orientation of the graphic using the position of the sticker 160 relative to the HMD 110. As an example, as the user 105 of the HMD 110 walks around the patient or sticker 160, the sticker system 100 may update the graphic to show a different perspective or angle, e.g., of a 3D model of the patient's heart. Additionally, the sticker system 100 can update the size of the graphic as the user 105 walks closer to or further away from the patient or sticker 160.

In some embodiments, the sticker system 100 updates graphics responsive to detecting that a user 105 is gesturing or otherwise interacting with a sticker 160, e.g., pointing toward or at the location of the sticker 160. In some embodiments, the sticker system 100 generates an encryption key using the registration information (e.g., for a medical procedure), where the encryption key is unique to the sticker 160.

In one use case, the sticker system 100, executing on the HMD 110, may communicate with another device using the encryption key. In a different example, responsive to determining that the encryption key was previously used by another device for a different medical procedure, the sticker system 100 determines to not use the encryption key for a current medical procedure. Thus, the sticker system 100 maintains the stickers for one-time use, e.g., for a particular procedure.

In some embodiments, the sticker system may use stickers in environments with multiple HMDs. For instance, the sticker system 100 processes an additional image to determine that the HMD 110 and another HMD are being used for a same medical procedure by comparing their associated registration information. Responsive to this determination, the sticker system 100 may coordinate information provided for presentation on the HMDs. For example, the sticker system 100 may synchronize annotations on graphics displayed on the HMDs, communicate messages between the HMDs, or share other data about the medical procedure between the HMDs.

V. Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system comprising:
    a computing device;
    a sticker including a fiducial marker; and
    a head-mounted device (HMD) worn by a user and comprising a non-transitory computer-readable storage medium storing instructions, the instructions when executed by one or more processors cause the one or more processors to perform steps including:
        receiving an image of the sticker captured by an imaging sensor of the HMD, the image showing the fiducial marker;
        determining registration information by processing the fiducial marker in the image;
        determining location information of the HMD;
        determining a position of the sticker relative to the HMD using the registration information and the location information;
        providing a graphic for presentation by the HMD to the user based on the position of the sticker;
        generating an encryption key using the registration information for a medical procedure, the encryption key unique to the sticker;
        determining that the HMD and the computing device are being used for the medical procedure; and
        responsive to determining that the HMD and the computing device are being used for the medical procedure, transmitting the location information from the HMD to the computing device over a wireless network communication using the encryption key.

2. The system of claim 1, wherein the non-transitory computer-readable storage medium stores further instructions that when executed by the one or more processors cause the one or more processors to perform steps including:
    determining additional registration information by processing an additional image showing the fiducial marker of the sticker, the additional image captured by an additional HMD; and
    determining that the HMD and the additional HMD are being used for the medical procedure by comparing the registration information and the additional registration information.

3. The system of claim 1, wherein the non-transitory computer-readable storage medium stores further instructions that when executed by the one or more processors cause the one or more processors to perform steps including:
    determining position of the sticker relative to the HMD by determining a distance and angle in 3D between the sticker and the HMD.

4. The system of claim 3, wherein size or orientation of the graphic is determined using the distance and angle.

5. The system of claim 1, wherein the non-transitory computer-readable storage medium stores further instructions that when executed by the one or more processors cause the one or more processors to perform steps including:
    generating augmented reality content as the graphic, wherein the HMD includes a display configured to present the augmented reality content.

6. The system of claim 1, wherein the fiducial marker is a QR code or a barcode.

7. The system of claim 1, wherein the non-transitory computer-readable storage medium stores further instructions that when executed by the one or more processors cause the one or more processors to perform steps including:
    responsive to determining that the HMD and the computing device are being used for the medical procedure, synchronizing annotations during the medical procedure on the graphic presented by the HMD and one or more graphics presented by the computing device.

8. A method comprising:
    receiving an image of a sticker captured by an imaging sensor, the image showing a fiducial marker of the sticker;
    determining registration information by processing the fiducial marker of the sticker in the image;
    determining location information of a head-mounted device (HMD) worn by a user;
    determining a position of the sticker relative to the HMD using the registration information and the location information;
    providing a graphic for presentation by the HMD to the user based on the position of the sticker;
    generating an encryption key using the registration information for a medical procedure, the encryption key unique to the sticker;
    determining that the HMD and a computing device are being used for the medical procedure; and
    responsive to determining that the HMD and the computing device are being used for the medical procedure, transmitting the location information from the HMD to the computing device over a wireless network communication using the encryption key.

9. The method of claim 8, further comprising:
    determining additional registration information by processing an additional image showing the fiducial marker of the sticker, the additional image captured by an additional HMD; and
    determining that the HMD and the additional HMD are being used for the medical procedure by comparing the registration information and the additional registration information.

10. The method of claim 8, wherein determining position of the sticker relative to the HMD comprises:
    determining a distance and angle in 3D between the sticker and the HMD.

11. The method of claim 10, wherein size or orientation of the graphic is determined using the distance and angle.

12. The method of claim 8, further comprising:
    generating augmented reality content as the graphic, wherein the HMD includes a display configured to present the augmented reality content.

13. The method of claim 8, wherein the imaging sensor is coupled to the HMD.

14. The method of claim 8, wherein the fiducial marker is a QR code or a barcode.

15. The method of claim 8, further comprising:
    responsive to determining that the HMD and the computing device are being used for the medical procedure, synchronizing annotations during the medical procedure on the graphic presented by the HMD and one or more graphics presented by the computing device.

16. A non-transitory computer-readable storage medium storing instructions, the instructions when executed by one or more processors cause the one or more processors to perform steps including:
    receiving an image of a sticker captured by an imaging sensor, the image showing a fiducial marker of the sticker;
    determining registration information by processing the fiducial marker of the sticker in the image;

determining location information of a head-mounted device (HMD) worn by a user;
determining a position of the sticker relative to the HMD using the registration information and the location information;
providing a graphic for presentation by the HMD to the user based on the position of the sticker;
generating an encryption key using the registration information for a medical procedure, the encryption key unique to the sticker;
determining that the HMD and a computing device are being used for the medical procedure; and
responsive to determining that the HMD and the computing device are being used for the medical procedure, transmitting the location information from the HMD to the computing device over a wireless network communication using the encryption key.

* * * * *